March 23, 1943.  E. SCHENK  2,314,738

METHOD OF ELECTRIC WELDING

Filed May 4, 1942

INVENTOR
Eduard Schenk
By Archworth Martin
His Attorney

Patented Mar. 23, 1943

2,314,738

UNITED STATES PATENT OFFICE 2,314,738

METHOD OF ELECTRIC WELDING

Eduard Schenk, Oakdale, Pa.

Application May 4, 1942, Serial No. 441,571

4 Claims. (Cl. 219—10)

This application constitutes a continuation in part of my application Ser. No. 390,688, filed April 28, 1941 (Patent No. 2,281,805) and relates to a method of welding electrically.

One method frequently employed in the welding of metals consists in creating an arc for softening the metal parts to be joined and then pressing the parts together, or for melting a weld rod from which molten metal will flow to the weld seam or joint. One of the objections to such methods arises out of the fact that difficulty is experienced in preventing excessive oxidation of the metal, and, furthermore, metal which has been melted by an arc frequently is weaker and spongy and contains blow holes and impurities. Also, it is too hard to be machined and must be ground.

Another method which is practiced involves the setting up of a sufficient current flow in the metal parts to be welded together, by induction or otherwise, and is known as resistance welding. Some of the objections to this procedure are the unnecessary heating of large areas of metal at points somewhat remote from the zone of the weld, excessive amount of electrical energy required, and the great length of time required to soften the parts which are to be joined.

One object of my invention is to provide a means and a method whereby welded joints can readily be effected electrically without substantial change in the physical or chemical character of the welded parts.

Another object of my invention is to provide a method whereby metal elements which are spaced slightly apart can effectively and quickly be joined by an electric welding operation, by completely filling in at the weld area with pure metal that is drawn into the weld joint, without the necessity of pushing the parts into engagement with one another, and also by largely excluding the atmosphere which has a deleterious effect on the weld.

In practicing my invention I make use of the phenomenon that alternating electrical currents in flowing through conductors in the manner contemplated by my invention are of greatest intensity at the surfaces thereof, and I have discovered that this tendency can be utilized effectively in the art of electric welding.

Figure 1:
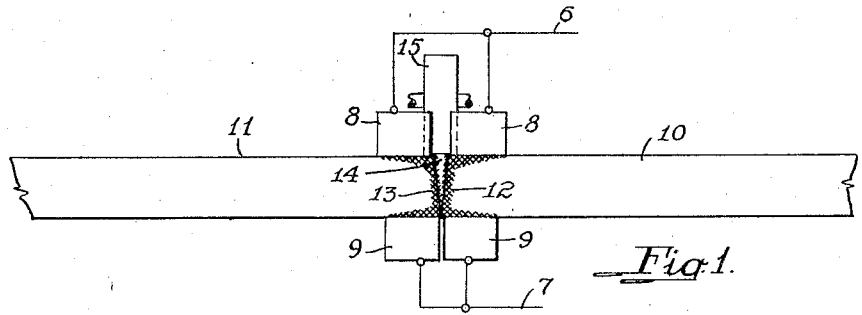
Figure 2:
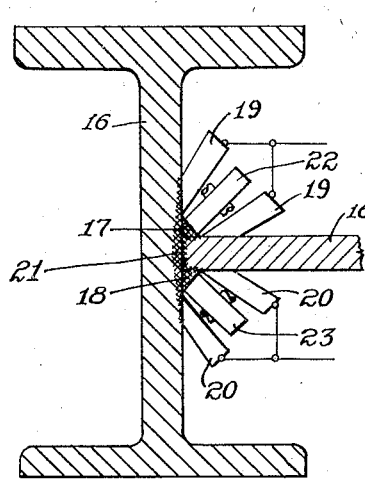
Figure 3:
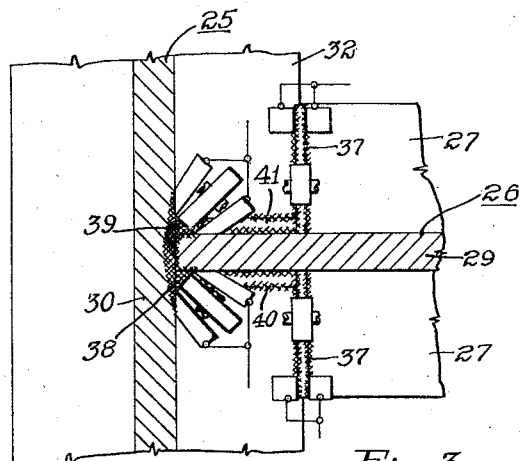
Figure 4:
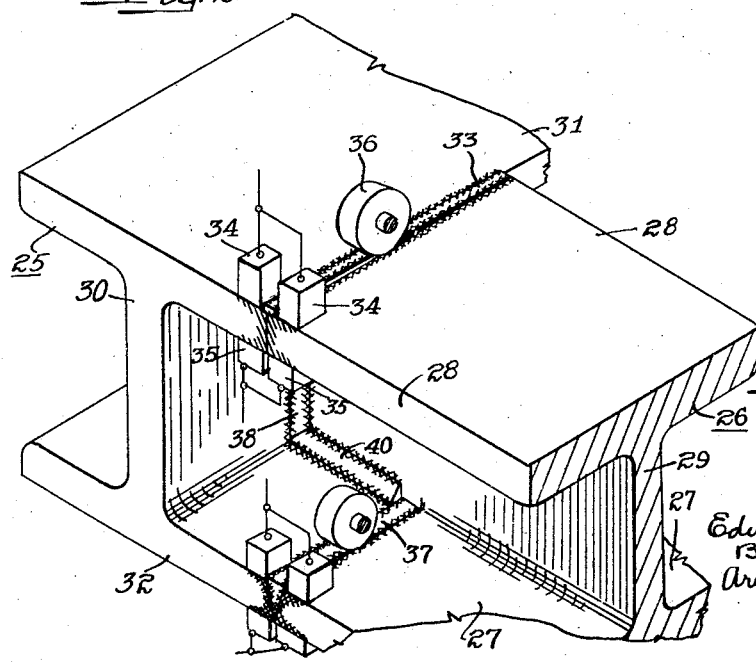

In the accompanying drawing, Figure 1 is a schematic view showing a manner in which my invention may be utilized in welding two members together; Fig. 2 is a vertical sectional view showing a manner in which two structural members may be welded together without the necessity of pushing the parts into engagement with one another during the welding operation; Fig. 3 is a horizontal sectional view showing the manner in which two I-beams may be welded together, and Fig. 4 is a perspective view schematically indicating the operation of welding the two I-beams together.

The tendency of alternating electrical current flow to be greater at the surfaces of conductors than at the interior sections thereof, is known in the art as the "skin effect." In the practice of my invention, I utilize this phenomenon and also arrange the conductor electrodes and the surfaces to be welded in such manner that there will be, in effect, current sheets flowing along the surfaces to be welded together, in such proximity that there will be a magnetic pull between the two current sheets or the current flows in the divided paths. The current flow through these paths must always be in the same direction at any given instance, and the magnetic linkage pull or attraction of the current in the adjacent paths tends to draw the conductors toward one another, besides further concentrating the current flow to the desired paths. This magnetic pull not only tends to concentrate the current flow at the area of weld, but also causes the softened metal areas to unite or knit together very effectively, through the pulling of added softened metal into the spaces between the members to be welded.

Referring first to Fig. 1, I show A. C. conductors 6 and 7 connected with pairs of electrodes 8 and 9 respectively. These electrodes are preferably of a material such as tungsten, having high melting temperature as compared to metal work pieces 10 and 11 which are to be joined. The electrodes may be in the form of blocks or in the form of rollers, if the latter form is preferred where it is desired to continuously weld traveling work pieces.

By reason of the skin effect referred to, the current flow from the electrodes 8 to the electrodes 9, and in the reverse direction, will be most intense in paths indicated by the shading at 12 and 13, and concentration of the current in these paths will be still further increased by reason of the magnetic attraction above referred to. As a result, not only will there be rapid heating and softening of the metal immediately at the surfaces to be welded, but there is a saving in current required, because there is no great amount of heating of the metal at points substantial distances from the areas at 12 and 13.

The work pieces 10 and 11 are chamfered at their inner edges, as is usual in arc-weldrod methods, for insuring the deposit of metal throughout the joint. A bar 14, which usually will be of the same character of metal as the members 10 and 11, will be inserted between the chamfered surfaces. The electrical current will flow in these surfaces as indicated at 12 and 13 and will cause the bar 14 to melt, and it will be drawn into the weld seam, between the edges of the members 10 and 12. A roller 15 or the like will usually be employed to press the bar 14 into place. As the metal becomes softened in the abutting surfaces of the members 10, 14 and 11, the softened metal of these members will unite and the joining of the metals will be more effective because of the magnetic attraction, than is the case where surfaces are heated in some other manner and dependence is placed largely upon mechanical external pressure in order to join them together. Furthermore, by my method there is less extrusion and forming of burrs of weld metal than where mechanical pressure is largely depended upon to unite softened surfaces.

In Fig. 2 I show the uniting of structural members 16 and 16¹ in generally abutting relation, although the surfaces to be united may be spaced apart some considerable distance. The method by which I unite the members will be particularly useful not only where the ends of two fixed members are to be united, but in structural framework where it is desired to connect two structural members such as 16 by a member such as 16¹. In this instance, I employ two wedge-shaped filler members 17 and 18, although in some instances one filler member will be sufficient. Pairs of electrodes 19 and 20 are employed and alternating current supplied thereto from any suitable source. These electrodes are brought into engagement with the members 16 and 16¹, so that there will be concentration of current flow as indicated by the shaded lines at 21. Rollers or other suitable presser members 22 and 23 are provided for holding the filler pieces 17 and 18 in place and slight pressure may be applied to facilitate the uniting of the softened surfaces.

Referring now to Figs. 3 and 4. I show a manner in which I-beams or the like can be connected. One I-beam is indicated by the numeral 25 and another by the numeral 26, it being understood that another I-beam 25 (not shown) may be connected to the other end of the beam 26. In this arrangement the welding operations are performed in a manner similar to that employed in making the joint of Fig. 2. If the beams are of the same depth, the beam 26 will have end portions of its lower flanges 27 and upper flanges 28 cut away, so that its web portion 29 will project into the beam 25, with its extremity in approximate abutting engagement with the web 30 of the beam 25. The cut-back extremities of the flanges 27 and 28 will be in proximity to or abut against the adjacent flanges 31 and 32 of the beam 25.

A filler strip 33 will be placed at the uppermost joint to be formed, whereupon electric current will be passed from the upper sides of the beams 25 and 26 to the lower faces of their upper flanges 31 and 28 respectively, through electrodes 34 and 35, a roller 36 being provided when desired to press the strip into place and to perhaps smooth off the softened metal.

Lower joints between the extremities of the flanges 27 and the flange 32 will be formed, as indicated at 37, in substantially the same manner as the welded joint of Fig. 1 is formed.

Where greater strength is required than that afforded by the joints at 33 and 37, additional zones of weld will be provided at 38, 39, 40 and 41, the lines of weld at 38 and 39 being effected in substantially the same manner as are the lines of weld in Fig. 2. The lines of weld at 40 and 41 will be formed in like manner, it being understood that a filler strip is employed in each instance to insure complete filling of the joint with the metal, even though the beams 25 and 26 do not have firm abutting engagement with one another.

The phenomena here are the same as described in connection with Fig. 1, namely, the utilization of the skin effect and the magnetic attractive forces resulting from the current flowing through the electrodes always in the same direction at any given instant.

In the practice of my invention, commercial voltages and frequencies of 110 volts, and 60 cycle A. C. current may suitably be employed through a suitable auto-transformer for raising the current to 3,000 amps., it being obvious, however, that other frequencies, voltage and amperage may be employed.

With current of the above value supplied, I have found that the abutting surfaces of the work pieces will be raised to a dripping white heat very quickly. Thus in welding together the edges of two blocks each one inch thick, three inches wide and four inches long, supported in an available lathe feed, it was difficult to shift the lathe feed rapidly enough to prevent the electrodes sinking into the blocks while moving the blocks between the electrodes, which indicated a very superior heating heretofore unknown. Further, the welding operation can be conducted so rapidly and with such small loss of heat that with the abutting edges at a dripping white heat the blocks could be touched by a person's finger at a distance only three inches from the zone of weld, without injury.

While I refer herein to the use of filler strips, it will be understood that short pieces of metal can be disposed along the joint to be welded, such pieces being softened by reason of their proximity to the opposed faces of the metal members and the concentration of current flow, the additional molten metal thus produced entering or being drawn into the weld seam, as above explained, so that there will be no cavity or depression along the weld seam such as would occur if no metal were supplied in addition to that contained within the structural members themselves.

I claim as my invention:

1. The method of welding an end of one metal member to the side of another metal member that has abutting engagement therewith, which comprises placing a metallic filler strip in an angle formed by the members, and directing a flow of alternating current across those areas of the members which are adjacent to the sides of the strip and across the abutting areas of said members, through electrodes disposed against the members at points adjacent to the remote edges of the said areas on each of the said members, the current flow across the said areas being always in the same direction at any given instant and maintained until the said areas and the filler metal becomes soft, the current frequency being such that there is magnetic concentration of current flow between the said abutting areas.

2. The method of welding an end of one metal member to the side of another metal member that has abutting engagement therewith, which comprises placing a metallic filler strip in an angle formed by the members, and directing a flow of alternating current across those areas of the members which are adjacent to the sides of the strip and across the abutting areas of said members, through electrodes disposed against the members at points adjacent to the remote edges of the said areas on each of the said members, the current flow across the said areas being always in the same direction at any given instant and maintained until the said areas and the filler metal becomes soft, the current frequency being such that there is magnetic concentration of current flow between the said abutting areas, and the welding operation being performed while the members are in relatively fixed positions.

3. The method of welding an end of one metal member to the side of another metal member that has abutting engagement therewith, which comprises placing a metallic filler strip at each side of the first-named member, in the angles formed by the members, and directing a flow of alternating current across those areas of the members which are adjacent to the sides of the strips and across the abutting areas of said members, through electrodes disposed against the members at points adjacent to the remote edges of the said areas on each of the said members, the current flow across the said areas being always in the same direction at any given instant and maintained until the said areas and the filler metal becomes soft, the current frequency being such that there is magnetic concentration of current flow between the said abutting areas.

4. The method of uniting metallic members, by welding, which comprises placing the members in proximity to one another, with certain areas thereof in abutting relation in position to be welded together, placing a metallic filler at one side of said members and along the line of the joint to be welded, and directing a flow of alternating current across those areas of the members which are adjacent to the sides of the filler and across said abutting areas, through electrodes disposed adjacent to the remote edges of the said areas on each of said members, the current flow across the said areas being always in the same direction at any given instant, and always maintained until the said areas and the filler metal become soft, the current frequency being such that there is magnetic concentration of current flow between the said abutting areas.

EDUARD SCHENK.